United States Patent [19]

McAlpine

[11] Patent Number: 5,778,936
[45] Date of Patent: Jul. 14, 1998

[54] FULL FLOW WINDING MACHINE

[75] Inventor: George McAlpine, Cary, N.C.

[73] Assignee: Danby of North America, Cary, N.C.

[21] Appl. No.: 689,015

[22] Filed: Jul. 30, 1996

[51] Int. Cl.[6] .................................................. F16L 55/16
[52] U.S. Cl. .......................... 138/97; 138/98; 156/287; 156/294; 264/36; 264/516; 264/267
[58] Field of Search .................. 138/98, 97; 264/36, 264/516, 269; 156/287, 294

[56] References Cited

U.S. PATENT DOCUMENTS

| | | | |
|---|---|---|---|
| 4,334,943 | 6/1982 | Zenbayashi et al. | 156/287 |
| 4,589,447 | 5/1986 | Kane et al. | 138/98 |
| 4,773,450 | 9/1988 | Stanley | 138/98 |
| 4,777,984 | 10/1988 | Storah | 138/98 |
| 4,865,673 | 9/1989 | Shishkin et al. | 156/287 X |
| 4,867,921 | 9/1989 | Skeketee, Jr. | 264/36 |
| 4,963,211 | 10/1990 | Allen et al. | 156/195 |

Primary Examiner—Patrick F. Brinson
Attorney, Agent, or Firm—Hazel & Thomas

[57] ABSTRACT

A system for generating a liner tube for an underground pipe while material is flowing through the pipe, incorporates a liner winding assembly, a carriage assembly connected to the liner tube being formed, a towing device for generating a pulling force on the carriage assembly and the liner tube being formed, and a liner hub assembly fixedly connected to the liner tube for operatively connecting the carriage assembly with the liner tube. The liner winding assembly includes a feeding and driving device for feeding liner material into the underground pipe, a device for forming the liner material into a liner tube, and a mounting device for fixedly mounting the feeding and driving device and the forming means in the underground pipe. The feeding and driving device generates a driving force to move the liner tube into and through the underground pipe as the liner tube is being formed. The carriage assembly is operatively connected to a front end of the liner tube, and includes a structure for movably supporting the carriage assembly as the liner tube moves into and through the underground pipe. The carriage assembly further generates a torque on the liner tube as the towing device is pulling the carriage assembly. The liner hub assembly is fixedly connected to the liner tube, whereby the pulling force of the towing device translated into the torque of the carriage assembly is operatively exerted on the liner tube releasing the liner tube from obstructions.

15 Claims, 9 Drawing Sheets

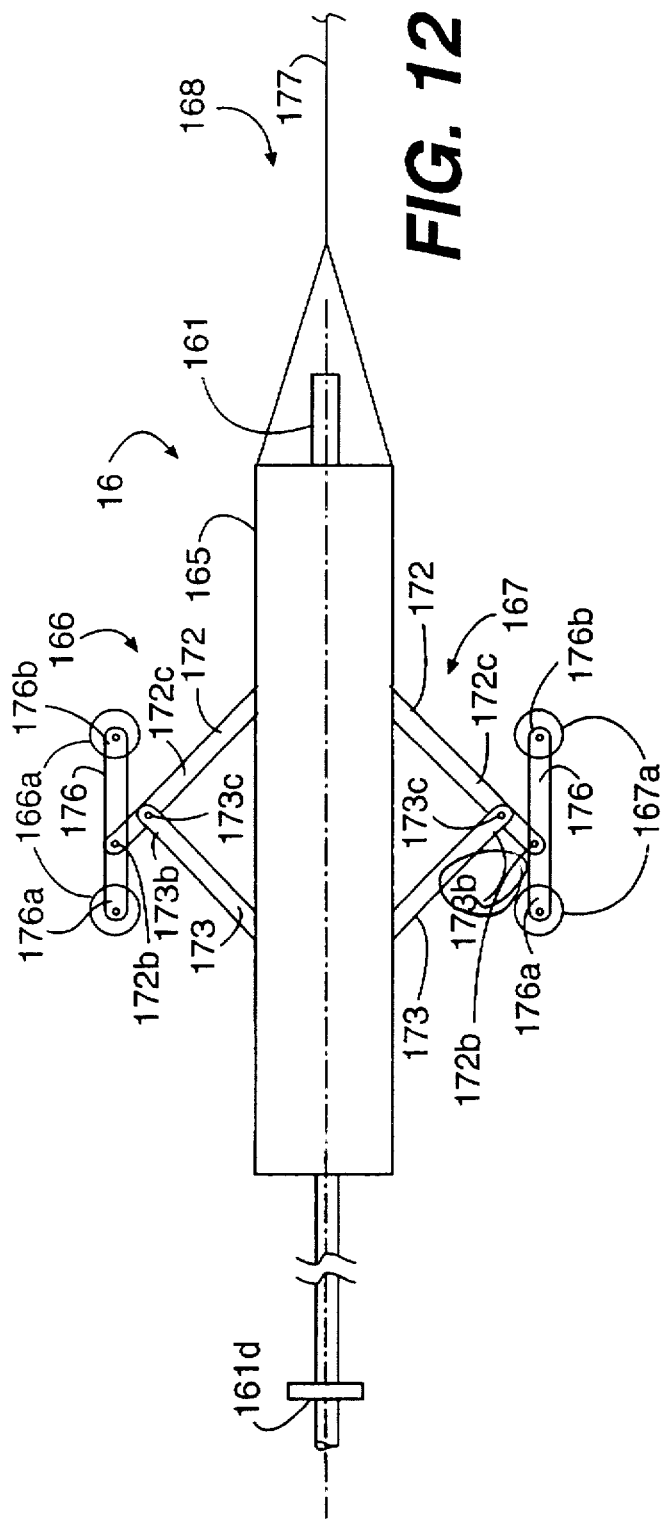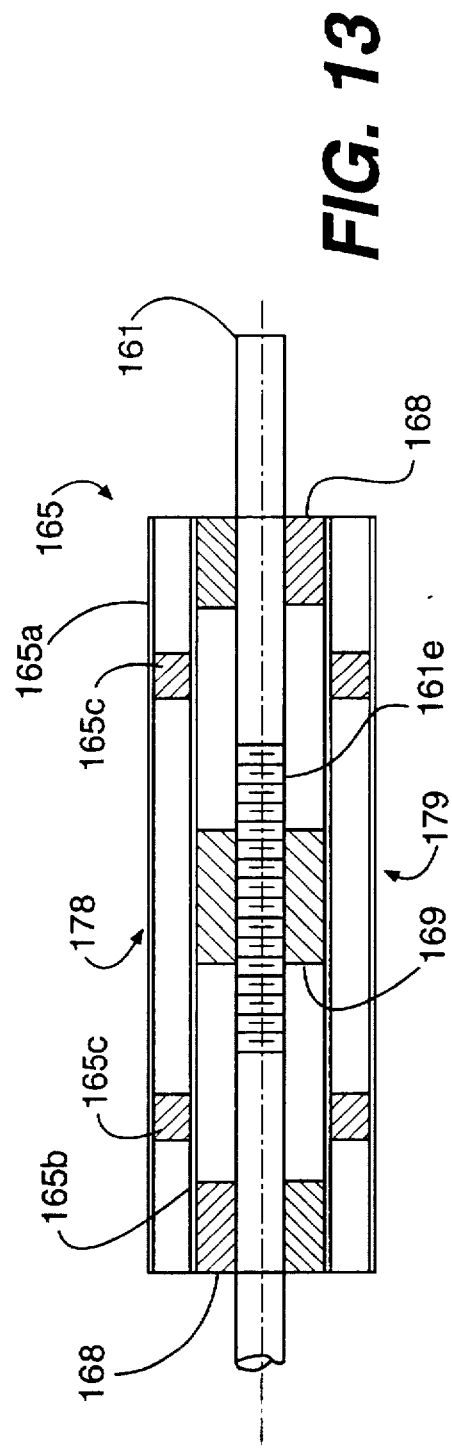

FULL FLOW WINDING MACHINE

BACKGROUND OF THE INVENTION

1. Field of the Invention

The present invention generally relates to a system for lining underground sewage pipes. More particularly, the present invention relates to the method and apparatus for lining large, underground sewer pipes without diverting the flow of sewage through the pipe during the lining process.

2. Description of the Prior Art

Over time, underground sewer pipes will structurally deteriorate as a result of corrosion due to the presence of certain chemicals (e.g., hydrogen sulfide) and exposure to the elements (e.g., seasonal changes in temperature, vibration and pressure from above-ground activity, shifting in the surrounding earth, and the flow of water, waste chemicals and other discarded debris). Also, the sewer pipes can become obstructed by organic growth, the infiltration of plant roots or the sedimentary build-up of debris. Eventually, the flow of sewage may be blocked or the pipe itself may collapse. In addition, a structurally deteriorating pipe may result in ground water entering the sewage flow, thereby increasing the amount of material flowing to a sewage treatment plant. Such increases in the amount of material to be processed can unnecessarily overburden the operation of the sewage treatment plant.

As is well-known in the art, all underground sewage pipes, especially those in advanced stages of deterioration or obstruction, must eventually be replaced or repaired. However, replacing underground sewer pipes is costly and can severely disrupt the normal activities that take place in the areas above the pipe (e.g., automotive traffic, pedestrian traffic, commercial business). Consequently, repairing the pipes is the preferred alternative for solving the problem of the deteriorated/obstructed pipes. As is known in the art, relining the pipes is the preferred method of repair for reducing costs and minimizing the level of disruption to surface activities.

One known technique for relining a pipe involves installing a cylinder of liner material to form a new inner surface for the deteriorated pipe. This cylinder of liner material may be formed by spirally winding together a strip of unplasticized/rigid polyvinylchloride (uPVC). The resulting cylinder of liner material is pushed through the pipe as it is being formed, thereby creating a new passage through which sewage will flow.

However, due to the various ways that a pipe can become deteriorated as described above, sewer pipes often have numerous obstructions that project into their interior. These obstructions can catch and hold the leading edge of the liner cylinder as it is being pushed through the pipes. One conventional method of moving the leading edge of the cylinder past any obstructions is to pull, rather than push, the leading edge of the cylinder over the obstructions. The cylinder may then be pushed further through the pipe after the leading edge of the cylinder has been pulled through the obstructed area.

When an underground pipe is undergoing a conventional relining process, the location of the equipment used to wind and push the liner cylinder through the pipe can itself result in the obstruction of the flow of sewage through the pipe being repaired. For example, pipes having diameters of 36 inches or less can be almost completely blocked by the presence of conventional liner-emplacing equipment.

Consequently, in conjunction with the use of many current lining systems in the actual repairs to the sewage pipes, the flow of sewage must be diverted into an adjacent or parallel pipe, or pumped from the sewers into temporary piping on the surface and back into the sewers downstream of the pipes being repaired. Diverting the normal flow of sewage in such a manner is expensive, time consuming, unsightly, and disruptive to the normal activities in the surrounding area. Further, any disruption to any component of the diverting and pumping system, such as damage to the pumps or to the temporary piping, subjects not only the diverting and pumping system but also the entire repair operation to delay or failure at potentially catastrophic levels. With the large diameter pipes, such methods of bypassing sewage flow may even be impossible if the rate and/or volume of sewage flow through the pipes is extremely high.

In light of all the above, there exists a need in the art for a system that overcomes the problems encountered by current systems and techniques. In particular, there exists a need for a method and apparatus for lining a pipe that allow sewage to flow uninterrupted through the pipe while the pipe is being lined.

In conjunction, there exists a need for a system that overcomes the problem of obstructions projecting into the interior of the pipe that hinder the progressive lining of the pipe. Specifically, there exists a need for a method and apparatus for aiding the positioning of a cylinder of liner material through a pipe and around obstructions located within the pipe.

SUMMARY OF THE INVENTION

A primary object of the present invention is to provide a system that overcomes the problems in lining a pipe without interrupting the flow of sewage therethrough as encountered by current systems and techniques.

Another main object of the present invention is to provide a system that overcomes the problem of obstructions projecting into the interior of the pipe that hinder the progressive lining of the pipe. Specifically, another main object of the present invention is to provide a method and apparatus for aiding the positioning of a cylinder of liner material through a pipe and around obstructions located within the pipe.

An additional object of the present invention is to provide a method and apparatus for progressively lining the interior of a pipe incorporating a means for rotating the liner as the liner is being formed and moves through the pipe.

A further object of the present invention is to provide a method and apparatus for progressively lining the interior of a pipe incorporating a means for providing supplemental torquing of the liner as the liner is being formed and moves through the pipe.

In view of the various objects of the present invention, the invention in one aspect is directed to a system for forming a liner in an underground pipe while material is flowing through the liner and pipe. The system incorporates means for assembling a liner tube to line the underground pipe, and means for preventing the liner tube from being obstructed in the underground pipe as the liner tube is being assembled. The assembling means includes means for feeding strips of liner material into the underground pipe, means for forming the liner material from the feeding means into the liner tube, and means for mounting the feeding means and the forming means in the underground pipe.

In a second aspect, the present invention is directed to a system that incorporates a liner winding assembly, a carriage assembly, a towing device and a liner hub assembly. The liner winding assembly includes a feeding and driving device for feeding liner material into the underground pipe, means for forming the liner material into a liner tube, and a mounting device for fixedly mounting the feeding and driving device and the forming means in the underground pipe. The feeding and driving device includes means for generating a driving force to rotatively move the liner tube into and through the underground pipe as the liner tube is being formed. The carriage assembly is operatively connected to a front end of the liner tube being formed, and includes means for movably supporting the carriage assembly as the liner tube moves into and through the underground pipe. The towing device generates a pulling force on the carriage assembly which, in turn, generates a torque on the liner tube being formed so as to release the liner tube from obstructions by overcoming frictional resistance. The carriage assembly further includes means for generating a torque on the liner tube as the towing device is pulling the carriage assembly. The liner hub assembly includes means fixedly connected to the front end of the liner tube being formed, for operatively connecting the carriage assembly with the liner tube whereby the pulling force generated by the towing device generates torque through the carriage assembly which is then operatively exerted on the liner tube so as to release the liner tube from obstructions.

In a third aspect, the present invention is directed to a method for generating a liner tube in an underground pipe while material is flowing through the liner. The method includes the steps of feeding liner material into the underground pipe, spirally windingly forming the liner material into the liner tube while the liner material is being fed into the underground pipe, generating a driving force to rotatively move the liner tube into and through the underground pipe as the liner tube is being formed, and generating a torque on the liner tube being formed when obstructions are encountered in the underground tube so as to release the liner tube.

As a result of the present invention in all its aspects, the production of longer liners and/or complete linings through bends and curves for which the cumulative frictional drag may have stopped the lining process without the supplemental torque of the liner hub assembly.

Other objects and features of the present invention will be apparent from the following detailed description of the preferred embodiment.

BRIEF DESCRIPTION OF THE DRAWINGS

The invention will be further described in conjunction with the accompanying drawings, in which:

FIG. 12 illustrates a side view of the wheeled carriage assembly according to the present invention;

FIG. 13 illustrates a partial side cutaway view of the wheeled carriage assembly according to the present invention;

DETAILED DESCRIPTION OF THE PREFERRED EMBODIMENT

Figure 1:
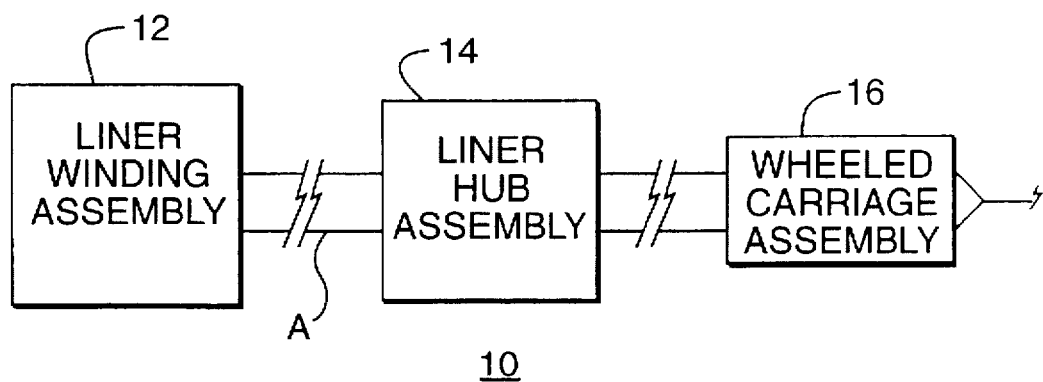
FIG. 1 illustrates a general block diagram of the entire full flow winding machine system according to the present invention.

With reference to the figures, like reference characters will be used to indicate like elements throughout the several views. As shown in FIG. 1, a full flow winding machine system 10 according to the present invention is composed of three primary sub-assemblies: a liner winding assembly 12 for forming a liner tube A, a liner hub assembly 14, and a wheeled carriage assembly 16. Each of these subassemblies will be discussed in detail below.

Figure 2:
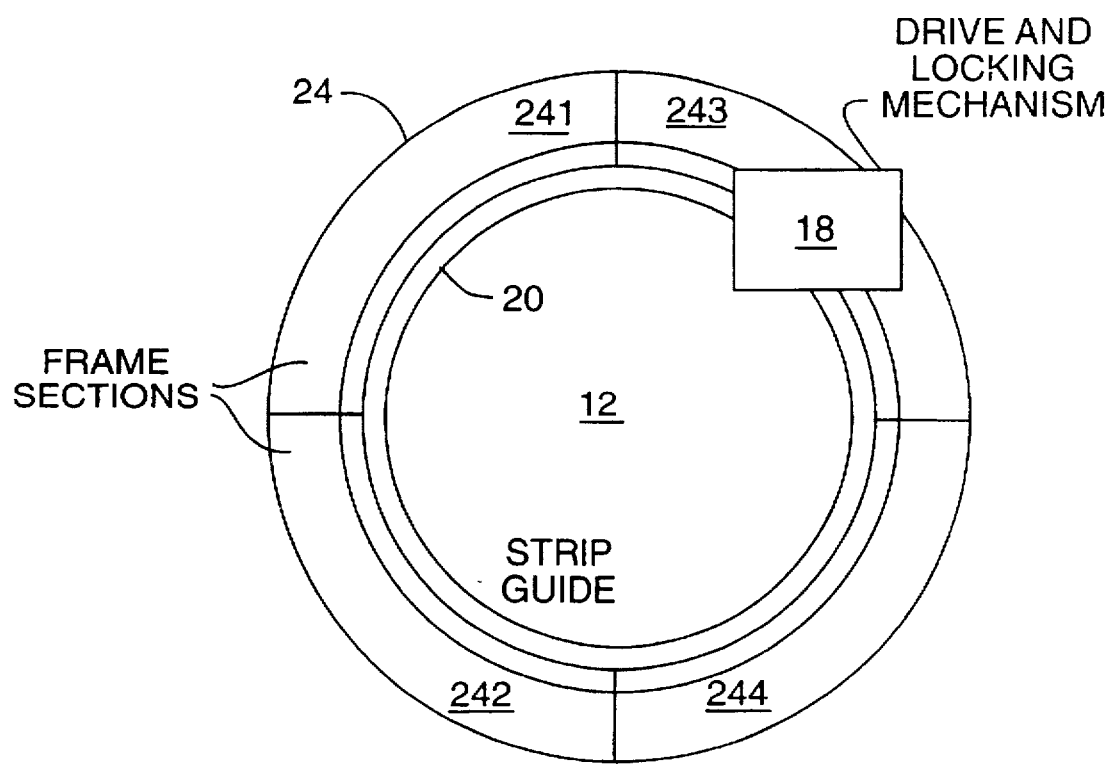
FIG. 2 illustrates a general front view of the liner winding assembly of the present invention.
Figure 3:
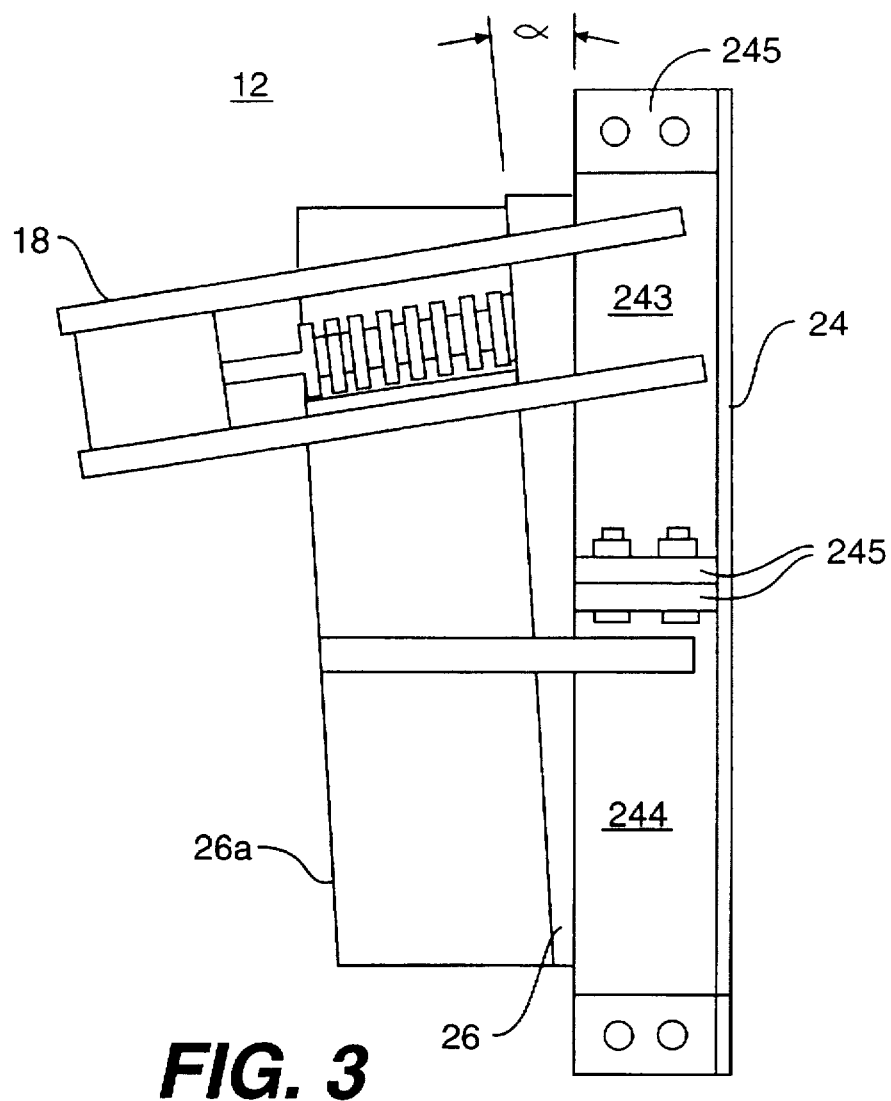
FIG. 3 shows a detailed side view of the liner winding assembly of the present invention.

In FIG. 2, the liner winding assembly 12 is shown and generally incorporates a drive and locking mechanism 18, a strip guide 20, and a frame 24 composed of four or more frame sections 241–244. As illustrated in FIG. 3, the frame sections are lockingly connected to one another, using, for example, locking nuts and bolts, whereby the frame 24 can support the strip guide 20 and the drive and locking mechanism 18. Similarly, the strip guide 20 and the drive and locking mechanism 18 are structured so as to be detachable from the entire assembly. To implement this feature, the strip guide 20 and the drive and locking mechanism 18 incorporate fasteners as known in the art that would allow them to be repeatedly attached to and detached from one another. For example, such fasteners include joints connected using nuts and bolts, joints with corresponding threaded connections, and locking hook latches between components. The use of separate sections of the frame 24, as well as the other separable components, is intended to allow the liner winding assembly 12 to be easily transported through and be set up in areas generally inaccessible to large pieces of equipment, i.e., through an 18-inch diameter manhole access opening. When assembled, the liner winding assembly 12 is mechanically anchored in position, such as to the inner walls of the manhole.

In the preferred embodiment, the frame sections 241–244 are constructed so as to anchor around a substantially circular sewer pipe and form a substantially circular inner diameter. However, the frame sections may be tailored to fit within pipes having other cross-sectional shapes. For example, the outer diameter of the frame 24 may be formed so as to anchor within a rectangular sewer pipe, while the inner diameter of the frame is substantially circular in order to form the circular liner.

Also in the preferred embodiment, the frame sections 241-244 are formed from stainless steel and are L-shaped in cross-section for structural rigidity (See FIG. 3). Mounting flanges 245 are formed on both ends of each frame section, whereby adjacent frame sections may lockingly attach to one another. As noted above, one embodiment for attaching the frame sections incorporates locking nuts and bolts that fasten adjacent mounting flanges 245 together through mounting holes (not shown) defined in the flanges.

Figure 4:
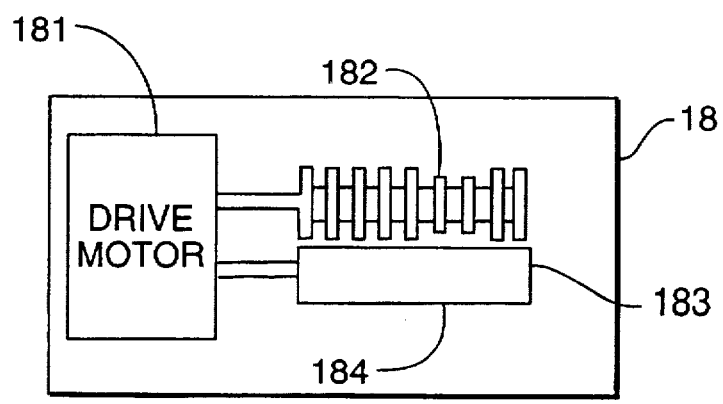
FIG. 4 shows a block diagram illustrating the components of the drive and locking mechanism incorporated in the liner winding assembly of the present invention.
Figure 5A:
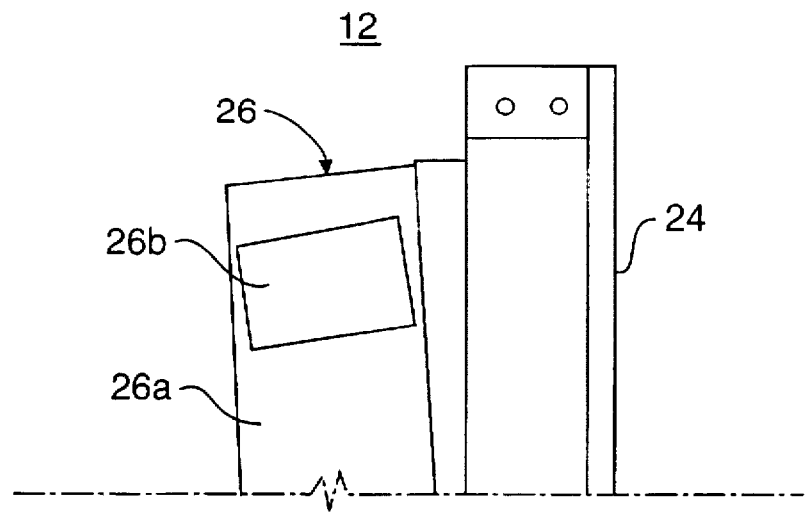
FIG. 5A shows partial view of the liner winding assembly of the present invention to further illustrate the strip guide therewithin.

As shown in FIG. 4, the drive and locking mechanism 18 includes a drive motor 181, a guide roller 182 and a drive roller 183. The strip guide 20 is a cylindrical element that is positioned with the inner diameter of the frame 24 (See FIGS. 5A and 5B). Specifically, the strip guide 20 is attached via a mounting element 26 such that the strip guide 20 is positioned at an angle a relative to the plane of the frame 24. To hold the strip guide in place against the flow of water or sewage through the pipe, the mounting element 26 comprises a stainless steel outer frame or cover 26a that surrounds at least 340° of the outer circumference of the strip guide 20. As illustrated in FIG. 5A, within the 20° field not covered by the outer frame 26a, the outer frame defines a window 26b through which the liner strip material is fed. The strip guide 20 is then fastened to the mounting element 26 using a conventional fastening system as known in the art, e.g. nut and bolt combinations.

In a preferred embodiment, the strip guide 20 is formed from a flexible strip of polyethylene material whose ends are put together to form its cylindrical shape. However, the strip guide 20 may also be formed from stainless steel, aluminum or other rigid and lightweight materials. In such embodiments, the strip guide 20 would comprise a plurality of sections designed to lockingly attach to one another when mounted on the frame 24.

Figure 5B:
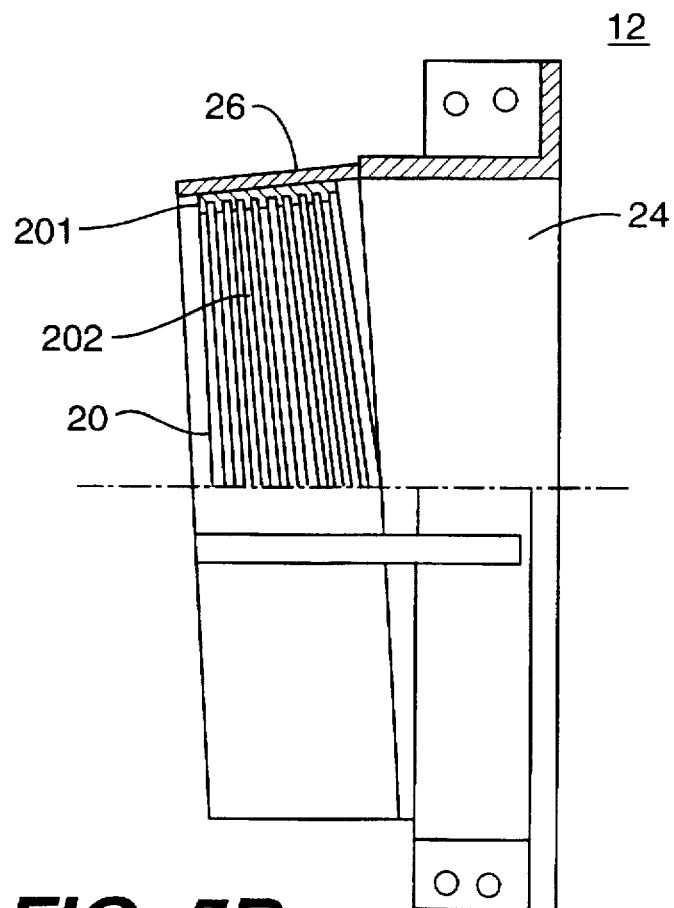
FIG. 5B shows cutaway view of the strip guide as would be incorporated in the interior of the liner winding assembly of the present invention.

As shown in FIG. 5B, within the outer frame 26a, the strip guide 20 is mounted at an angle α relative to the frame 24 so as to properly guide the liner strip material, as will be explained hereinbelow. Along the interior surface of the strip guide 20, a plurality of notches 201 are formed, each notch extending around the entire periphery of the strip guide's interior surface. The plurality of notches 201 together define a series of grooves 202 that are spaced complementary to the configuration of projections formed on one side of the liner strip material. The structure of the grooves 202 in the strip guide 20 is consistent with the grooves of the rollers incorporated in the tube winding system described in U.S. Pat. No. 4,963,211 to Allen et al., which is incorporated herein by reference.

The drive and locking mechanism 18 is positioned on the frame 24 to align with the window 201 of the strip guide 20, whereby the drive roller 182 and the guide roller 183 are parallel to the window 201 and the notches 202. This allows the liner strip material to be fed between the drive roller 182 and the guide roller 183, and through the window 201 to inter-engage with the grooves 202, as will be discussed in the operation of the invention below.

The dimensions, i.e., the diameter, of the strip guide 20 are determined by the diameter of the liner intended to be produced. Further, the angle α is also determined by the diameter of the liner to be produced. In general, the dimensions of the strip guide 20 are selected whereby the liner strip material fed through the window 201 will traverse one complete revolution within the strip guide 20. This will allow the liner strip material already wound into a liner to properly align and connect with the liner strip material being constantly fed through the window 201. The calculation of the strip guide's dimensions and the value of the angle α would be readily known to one of skill in the art. Typical values of α range from 1°-5°.

In the preferred embodiment of the invention, the drive motor 181 is a conventional hydraulic motor that rotates at least one of the drive roller 183 and the guide roller 182. The drive roller 183, as shown in FIG. 4, has a generally cylindrical shape with a high friction coating 184 on its exterior surface. The high friction coating 184 may be composed of rubber or other materials that exhibit similar frictional characteristics.

The drive roller 183 with its coating 184 is held in frictional contact with the liner strip material being fed between it and the guide roller 182. As noted above, the guide roller 182 is located adjacent and parallel to the drive roller 183 and to the window 201. When liner strip material is feeding between the drive roller 183 and the guide roller 182, the two rollers are counter-rotating relative to one another. The guide roller 182 is mounted so as to be adjustably movable relative to the drive roller 182 allowing a user to control the amount of pressure on the liner strip material fed between them. Typical distances for setting between the drive roller 183 and the guide roller 182 range between 60/1000 in. to 120/1000 in. The guide roller 182 is substantially cylindrical with a number of circumferential grooves 185. The structure of the guide roller 182 is also consistent with the rollers incorporated in the tube winding system described in U.S. Pat. No. 4,963,211 to Allen et al.

As with the rollers in the '211 patent to Allen et al. and the strip guide 20, as discussed above, the grooves 185 are spaced complementary to the configuration of projections formed on one side of the liner strip material. Further, the drive and locking mechanism 18 incorporates a locking mechanism (not shown) for joining adjacent windings of the liner strip material as the material completes its one revolution in the strip guide 20. One embodiment for a locking mechanism applicable to the present invention is disclosed in the '211 patent. In that embodiment, the locking mechanism feeds a locking strip that joins side flanges along the longitudinal edges of opposing adjacent portions of the liner strip material. The locking mechanism is positioned adjacent to a guide roller similar to the guide roller 182 and to an opening similar to the window 201. This arrangement allows the locking strip to join the side flange of liner strip material being fed with the opposing side flange of wound liner strip material emerging as a liner tube A. However, as one of ordinary skill in the art would understand, other mechanisms and techniques for connecting the liner strip material as it is being wound in the present invention would be applicable. For example, thermal welding, chemical welding and adhesives are a few of the techniques that may be applicable.

In operation, the liner winding assembly 12 is fixedly anchored within a manhole of a sewer pipe to be lined. Liner strip material is fed between the drive roller 183 and the guide roller 182. The hydraulic drive motor 181 drives the drive roller 183 whereby the frictional contact of the frictional coating 184 with the liner strip material feeds the liner strip material into the window 201 of the strip guide 20. The flanges and other projections on one side of the liner strip material inter-engage with the circumferential grooves 185, thereby guiding the liner strip material to the window 201. As the liner strip material enters through the window 201, the grooves 202 of the strip guide also inter-engage with the flanges and other projections of the liner strip material.

The driving force of the drive motor 181 through the drive roller 183 and the force of the strip guide 2Q against the liner strip material as the material enters the strip guide 20 causes the liner strip material to helically form along the inner wall (not shown) of the strip guide 20. As liner strip material is fed into the strip guide 20, the helical formation of the material develops into a liner tube A that progressively moves out of the liner winding assembly 12. As noted above, the liner strip material travels one single revolution within the strip guide 20. At the end of that single revolution, the liner strip material begins to helically align adjacent to liner strip material just entering through the window 201. At that point, as discussed above, a locking mechanism (not shown) joins opposing longitudinal edges of adjacent portions of the now helical liner strip material. As a result, as the helically-formed liner strip material emerges from the liner winding assembly 12, the material is already a fully-formed and assembled liner tube A.

In addition, as the liner strip material is helically fed into the strip guide 20, the liner tube A that is progressively formed rotates itself at the speed the liner strip material is fed. This winding, rotational motion generates a torque as well as a force in the forward direction that aids the liner tube A in moving down the sewer pipe. The torque and the force prevent the liner tube A from getting caught in or stopped by debris, defects, outcroppings or other obstructions in the sewer pipe.

Figure 6:
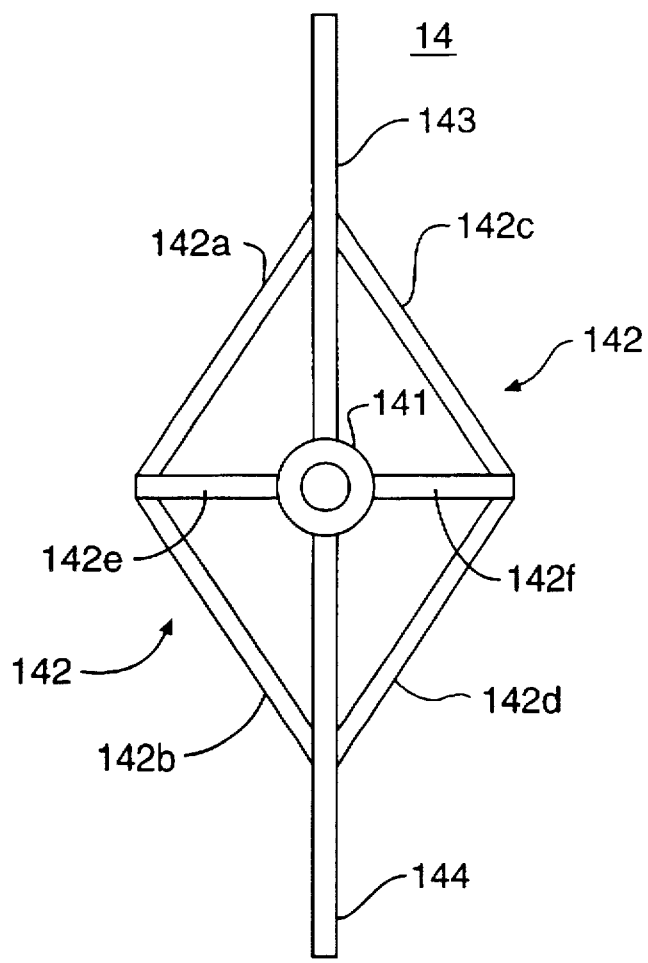
FIG. 6 illustrates a front view of a first embodiment of the liner hub assembly according to the present invention.
Figure 7:
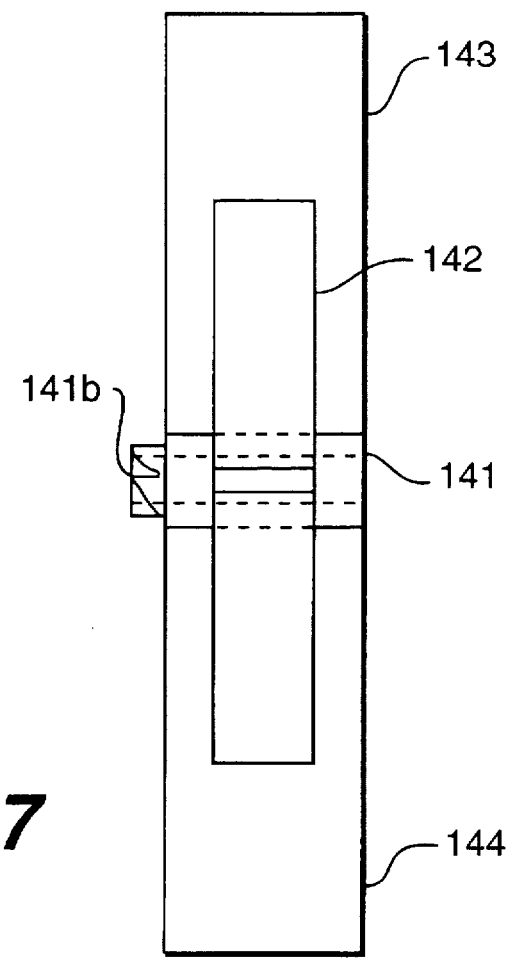
FIG. 7 illustrates a side view of the first embodiment of the liner hub assembly according to the present invention.

The liner hub assembly 14 shown in FIGS. 6 and 7 incorporates a shaft/clutch housing 141, a bracing structure 142 and at least two support spokes 143, 144. In this first embodiment, the support spokes are composed of upper spoke 143 and lower spoke 144. The support spokes 143, 144 are fixedly positioned on upper and lower portions, respectively, of the shaft/clutch housing 141. The shaft/clutch housing 141 is composed of a hollow, cylindrical guide portion 141a with a spiral jaw clutch face 141b on one end thereof, i.e., a left end of the cylindrical guide portion 141a. The liner hub assembly 14 also includes a bracing structure 142 that, in this embodiment, is composed of truss bracings 142a–142d fixedly connected between the support spokes 143, 144 and left and right bracing arms 142e, 142f, respectively. The bracing structure 142 is used to rigidly support the upper and lower spokes 143, 144.

Figure 8:
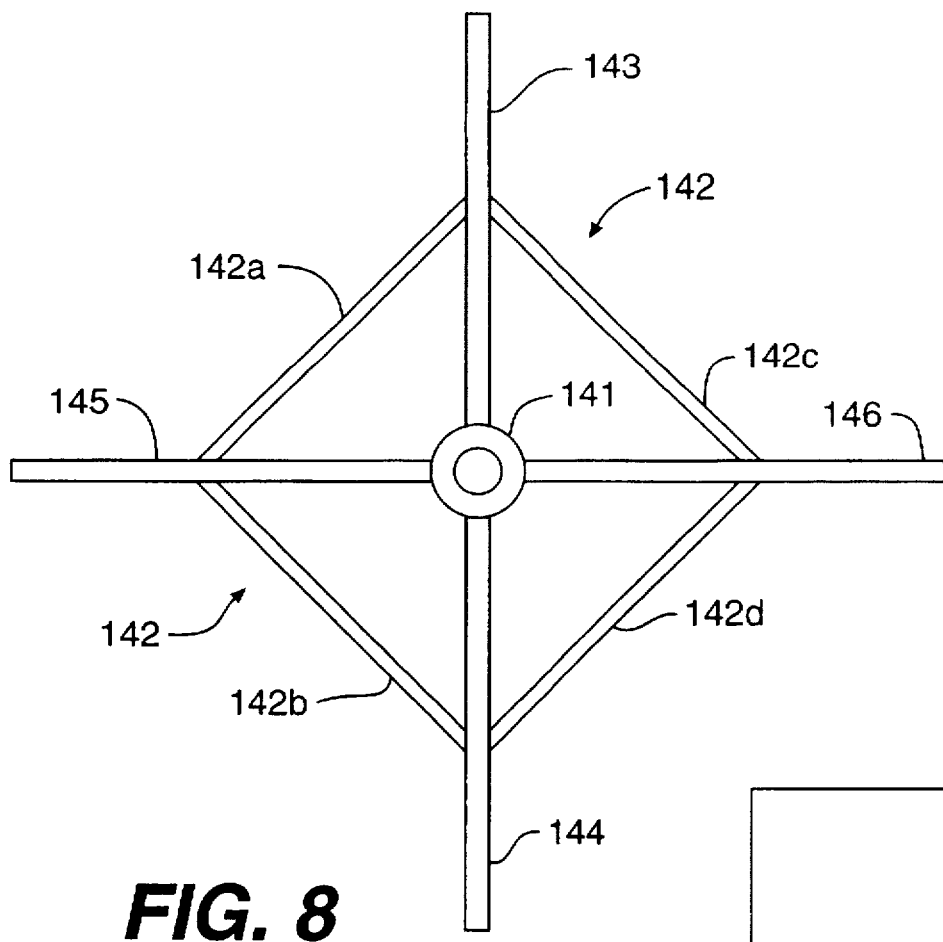
FIG. 8 illustrates a front view of a second embodiment of the liner hub assembly according to the present invention.
Figure 9:
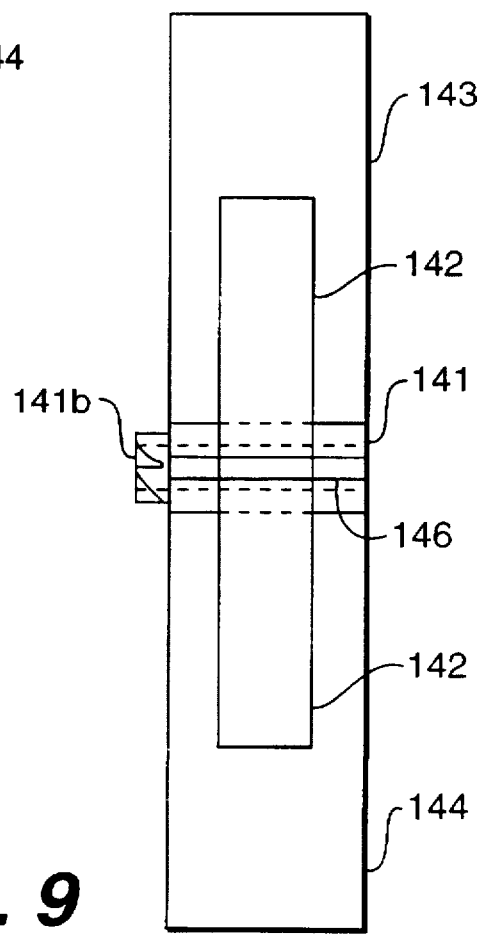
FIG. 9 illustrates a side view of the second embodiment of the liner hub assembly according to the present invention.

In a second embodiment of the liner hub assembly 14, FIGS. 8 and 9 show a shaft/clutch housing 141, a bracing structure 142 and support spokes 143 –146. In this embodiment, the support spokes include upper spoke 143, lower spoke 144, left spoke 145 and right spoke 146. Like the first embodiment, the shaft/clutch housing 141 has a hollow, cylindrical guide portion 141a with a spiral jaw clutch face 141b on one end thereof, i.e., a left end of the cylindrical guide portion 141a. However, in this second embodiment, the bracing structure 142 incorporates truss bracings 142a–142d fixedly connected between the support spokes 143–146.

In operation, the liner hub assembly 14 is fixedly anchored at the front end of the liner tube A that progressively moves into the sewer pipe as the tube is formed by the liner winding assembly 12. Consequently, the liner hub assembly 14 rotates with the liner tube A as it winds through the sewer pipe. The liner hub assembly 14 may be anchored using any of a variety of conventional attaching devices of sufficient strength to prevent the liner hub assembly 14 from detaching from the liner tube A during the tube's construction. Such devices include screws and nut/bolt combinations.

Figure 10:
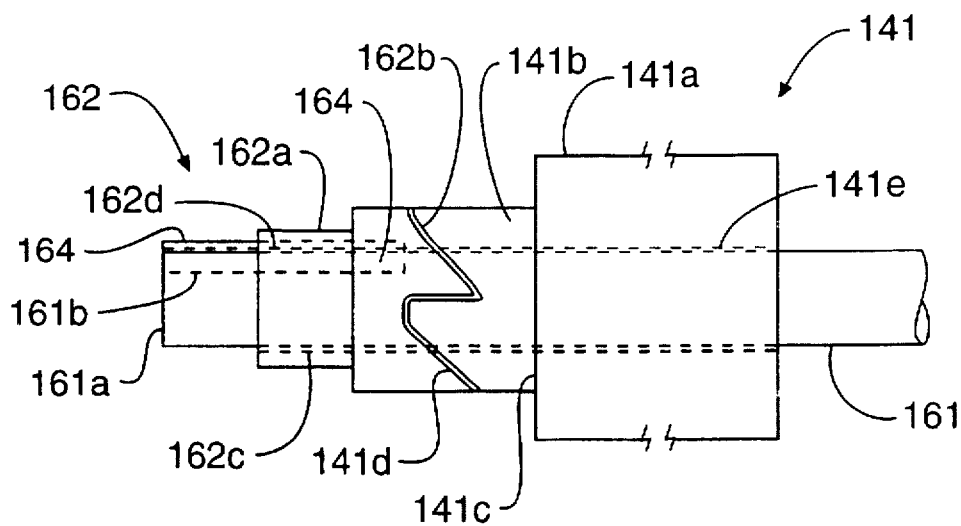
FIG. 10 shows a detailed partial view of one embodiment for the spiral jaw clutch incorporated in the liner hub assembly of the present invention.
Figure 11:
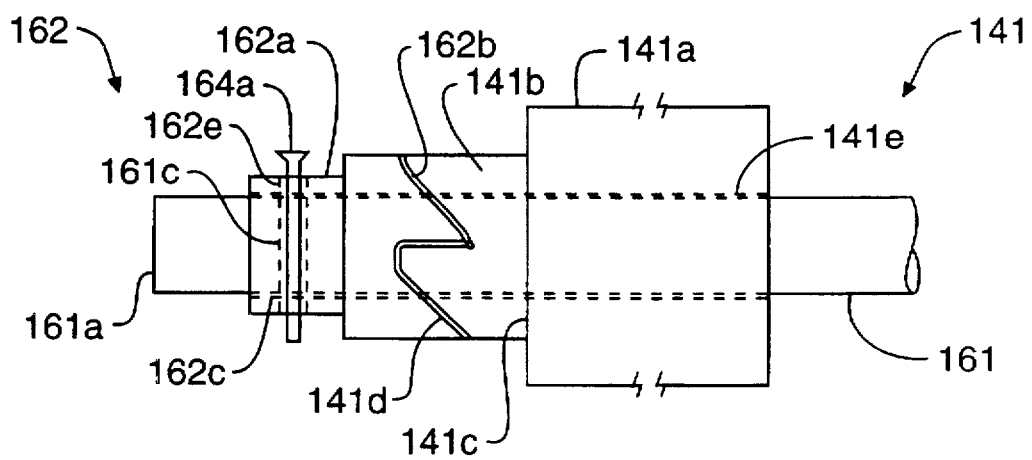
FIG. 11 shows a detailed partial view of a second embodiment for the spiral jaw clutch incorporated in the liner hub assembly of the present invention.

As shown in FIG. 10 or 11, the spiral jaw clutch face 141b attached to the cylindrical guide portion 141a is composed of a base portion 141c that is fixedly connected to the cylindrical guide portion 141a and torque-receiving clutch teeth 141d. A bore 141e is formed through the cylindrical guide portion 141a and the spiral jaw clutch face 141b. During the operation of the liner hub assembly 14, a lead screw shaft 161 from the wheeled carriage assembly 16 is fed through the bore 141e of the cylindrical guide portion 141a and spiral jaw clutch face 141b. A second spiral jaw clutch face 162 that mates with the first spiral jaw clutch face 141b is then fixedly connected at its base portion 162a to the end 161a of the lead screw shaft 161. Specifically, a bore 162c is defined through the second spiral jaw clutch face 162 and formed to receive the lead screw shaft 161. Torque-transmitting clutch teeth 162b of the second spiral jaw clutch face 162 are positioned to face the clutch teeth 141d whereby the clutch teeth of the spiral jaw clutch faces 141b, 162 will inter-engagingly mate and lock with one another when the lead screw shaft 161 is partially withdrawn. As a result, when torque is applied to the lead screw shaft 161, the torque is then transmitted from the lead screw shaft through the clutch teeth 162b to the clutch teeth 141d, and then to the liner hub assembly 14. The lead screw shaft 161 is otherwise freely movable within the bore 141e.

When torque is transmitted from the lead screw shaft 161 to the liner hub assembly 14, the liner hub assembly 14 will begin to rotate. Correspondingly, torque generated by the rotation of the liner hub assembly 14 will then be transmitted to and rotate the liner tube A fixedly attached to the liner hub assembly 14.

In both of the preferred embodiments of the liner hub assembly 14, the shaft/clutch housing 141 and spiral jaw clutch face 141b may be formed, for example, by using stainless steel. Similarly, the bracing structure 142 and support spokes 143–146 may be formed using stainless steel. However, other materials and processes appropriate for producing any of the components of the liner hub assembly as known in the art may be used. Overall, the selection of materials for constructing the liner hub assembly 14 is directed to preventing the elements and environment present in the underground pipe from damaging the liner hub assembly (i.e., corrosion), as well as to optimizing the weight of the liner hub assembly 14 such that the force of the material moving through the pipe does not disrupt the position or movement of the liner hub assembly 14.

As shown in FIG. 10, one embodiment for the second spiral jaw clutch face 162 being fixedly connected at its base portion 162a to the end 161a of the lead screw shaft 161 includes the structure of a key slot 161b defined along an outer surface of the lead screw shaft 161, and a key slot 162d defined along an inner bore surface of at least the base portion 162a of the second spiral jaw clutch face 162. Both of the key slots 161b and 162d are formed parallel to the longitudinal axis of the lead screw shaft 161. The lead screw shaft 161 is fed through the bore 162c of the spiral jaw clutch face 162 whereby the key slots 161b, 162d are opposingly aligned with one another to form a key cavity 163. A key 164 is then fixedly inserted into the key cavity 163 whereby the key 164 prevents at least rotational movement between the lead screw shaft 161 and the second spiral jaw clutch face 162. In this embodiment, axial movement of the second spiral jaw clutch face relative to the lead screw shaft 161 may be prevented by further forming the key cavity 163 in either the second spiral jaw clutch face 162 or the lead screw shaft 161 to hold the key 164 in place. Alternatively, a fastener device may be incorporated into the key 164 that would fixedly connect the key 164 to the lead screw shaft 161 as would be known in the art.

Another embodiment for the connection between the lead screw shaft 161 and the second spiral jaw clutch face 162 is illustrated in FIG. 11. As shown, both the lead screw shaft 161 and the second spiral jaw clutch 162 have bores 161c and 162c, respectively, defined perpendicular to their longitudinal axes. When the lead screw shaft 161 is fed through the bore 162c, the bores 161c and 162c are aligned whereby a pin 164a is fixedly inserted into the aligned bores. The pin 164a prevents both rotational and axial movement of the second spiral jaw clutch face 162 relative to the lead screw shaft 161.

The wheeled carriage assembly 16 in a first embodiment, as illustrated in FIGS. 12 and 13, incorporates the forward end of the lead screw shaft 161, a main carrier body 165, first and second stabilizer structures 166, 167, and a towing system 168. The lead screw shaft 161 further includes a stop washer 161d fixedly mounted thereto. The relative positions of the stop washer 161d and the second spiral jaw clutch face 162 along the lead screw shaft 161 are determined whereby, when lead screw shaft 161 is slidably positioned to rest the stop washer 161d against a front end of the shaft/clutch housing 141, the first and second spiral jaw clutch faces 141b, 162 are disengaged from one another. Inversely, when the lead screw shaft 161 is slidably positioned to engage the first and second spiral jaw clutch faces 141b, 162, the stop washer 161d is positioned away from the shaft/clutch housing 141.

Figure 15A:
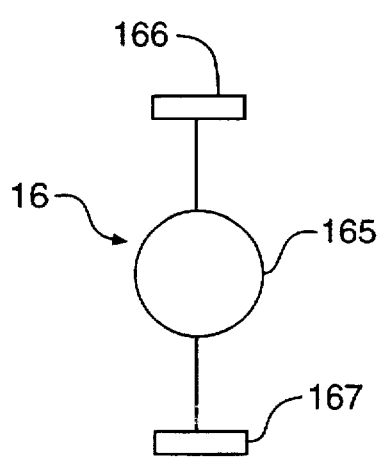
FIGS. 15A–15C illustrate generalized diagram for three embodiments of the stabilizer structures of the wheeled carriage assembly.
Figure 15B:
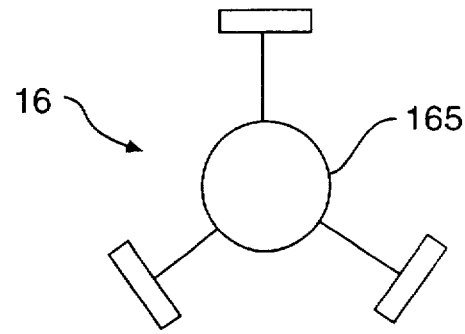
Figure 15C:
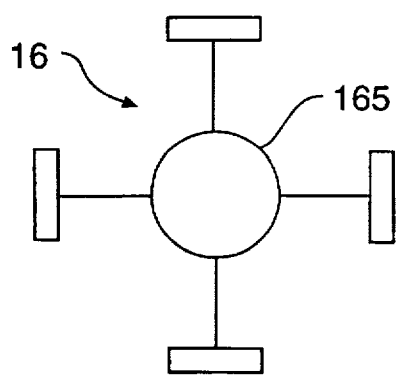

The lead screw shaft 161 is slidably fed through the main body 165. The stabilizer structures 166, 167 are constructed to resiliently engage the wheels 166a, 167a with the inner surface of the sewer pipe, whereby the wheels 166a, 167a are in constant contact with the inner walls during operation. In this first embodiment, as illustrated in FIG. 15A, the wheeled carriage assembly 16 incorporates two stabilizer structures 166, 167 that are 180° apart, whereby they are in constant contact with floor and ceiling portions of the inner walls. Alternatively, the wheeled carriage assembly 16 may incorporate three stabilizer structures that are 120° apart, as shown in FIG. 15B, or four stabilizer structures that are 90° apart, as shown in FIG. 15C. In the embodiment of FIG. 15B, the stabilizer structures would be in contact with ceiling and lower side wall portions of the inner walls. In the embodiment of FIG. 15C, the stabilizer structures would be in contact with floor, ceiling and side wall portions of the inner walls.

As shown in FIG. 13, the main body 165 is composed of a cylindrical outer housing 165a with a cylindrical inner housing 165b mounted therein via spacer bearings 165c. The outer housing 165a and inner housing 165b are further mounted to each other through a locking device (not shown) that allows limited relative translation between the outer housing 165a and the inner housing 165b through the bearings 165c, but prevents the actual separation between the two housings. The outer and inner housings 165a, 165b may be formed from, as an example, 3-inch and 2-inch diameter galvanized steel pipes, respectively. Correspondingly, the lead screw shaft 161 would be formed from a 1.5-inch diameter shaft of stainless steel. The spacer bearings may also be formed from stainless steel. Examples of locking devices known in the art for serving such a function include a key and key slot structure, and a pin and hole structure.

The lead screw shaft 161, as noted above, is fed through the main body 165 through the inner housing 165b. The lead screw shaft 161 is slidably and rotatably mounted on screw shaft bearings 168 at both ends of the interior of the inner housing 165b. Further, the lead screw shaft 161 is fed through a lead screw nut 169 that is fixedly positioned within the interior of the inner housing 165b. The lead screw shaft has a threaded portion 161e defined on its outer surface that engages with the lead screw nut 169. In order for the lead screw shaft 161 to slidably move back and forth through the main body 165, the lead screw shaft 161 rotates relative to the main body 165 through the inter-engagement of the threaded portion 161e with the lead screw nut 169. As will be explained further below, linear pulling force on the lead screw shaft 161 is translated into rotational torque on the liner hub assembly 14 and, consequently, the liner tube A.

The stabilizer structures 166, 167 are mounted on the outer surface of the inner housing 165b and protrude from the outer housing 165a through slotted openings 178, 179 defined parallel to the longitudinal axis of the main body 165 and on opposite sides thereof, whereby the stabilizer structures 166, 167 extend 180° apart from each other, i.e., from top and bottom surfaces of the main body 165.

Figure 14:
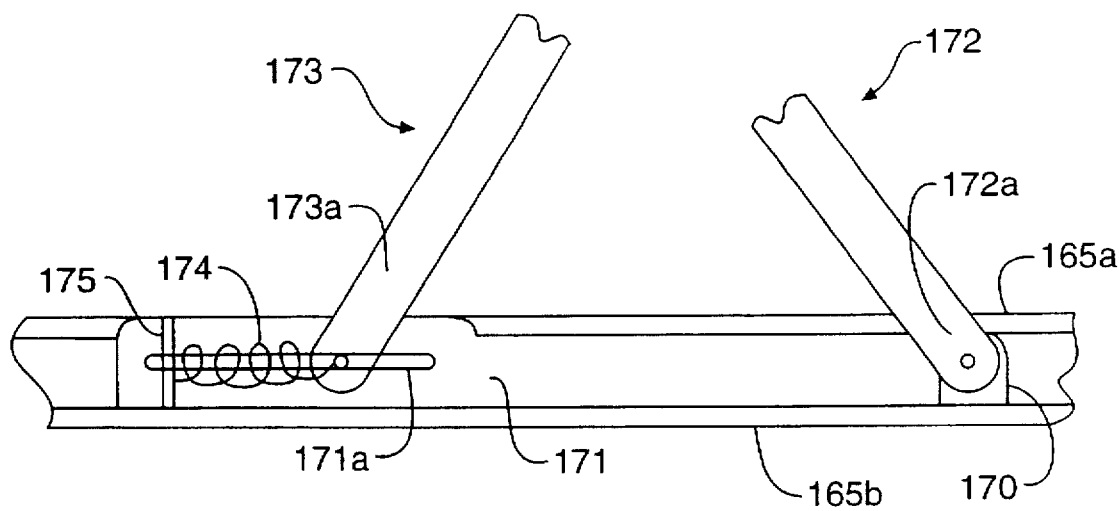
FIG. 14 shows a detailed partial cutaway view of the wheel strut structure of the stabilizer incorporated in the wheeled carriage assembly of the present invention.

As noted above, the stabilizer structures 166, 167 are constructed to resiliently engage the wheels 166a, 167a with the inner surface of the sewer pipe, thereby maintaining the wheels 166a, 167a in constant contact with the inner walls. As shown in FIGS. 12 and 14, each stabilizer incorporates a wheel strut 170 and a pin guide 171 fixedly mounted to the outer surface of the inner housing 165b. A base end 172a of a pivot arm 172 is rotatively hinged to the wheel strut 170. The pin guide 171 has defined thereon a pin slot 171a parallel to the longitudinal axis of the main body 165. A base end 173a of a sliding arm 173 is rotatively and slidably mounted on the pin slot 171a through a pin 173c. A spring 174 is fixedly connected between the pin 173c and an anchor 175 mounted on the inner housing 165b.

The outer end 173b of the sliding arm 173 is rotatively hinged at a hinge point 173d to a middle portion 172c of the pivot arm 172. The spring 174 is formed and the anchor 175 is located whereby the base end 173a of the sliding arm 173 is urgingly slid toward the front end of the carriage assembly 16. For example, as shown in FIG. 14, the anchor 175 may be located toward a rear end of the carriage assembly 16 and at an outer end of the pin guide 171. The spring 174 is designed to urgingly push the base end 173a toward the front end of the carriage assembly 16.

The sliding motion of the sliding arm 173 and the operation of the spring 174 cause the outer end 173b to push and thereby rotate the pivot arm 172 outwardly. The force of the spring 174 urgingly maintains the pivot arm 172 in the outward position.

The outer end 172b of the pivot arm 172 is rotatively hinged to the wheel base arm 176. Wheels 166a or 167a are mounted on both ends 176a, 176b of the wheel base arm 176. Through the spring-based urging motion of the pivot arm 172, the wheels 166a or 167a on the wheel base arm 176 are maintained in contact with the inner wall of the sewer pipe.

In a preferred embodiment of the wheeled carriage assembly 16, the various arm components of the stabilizer structures 166, 167 may be formed from stainless steel. The spring 174 may be formed from spring steel specially treated for the harsh chemical environment of the underground pipe. The wheels 166a, 167a on the wheel base arms 176 may be formed from solid rubber or other materials with sufficiently high coefficients of friction to maintain frictional contact with the walls of the pipe, despite the presence of corrosive and/or highly lubricating materials.

The towing system 168 is used to pull the wheeled carriage assembly 16 through the sewer pipe. Generally, this would occur only when the front end of the liner tube A being constructed gets caught in the sewer pipe. Engaging the towing system 168 engages the wheeled carriage assembly 16 to provide pulling force that is translated into torque to the liner tube A in order to free it from being caught on any obstruction in the sewer pipe. In the embodiment shown in FIG. 12, the towing system incorporates a cable 177 fixedly attached to the front end of the main body 165. The cable is then attached to a winch (not shown) located further down the sewer pipe for pulling on the towing system 168.

In operation, the wheel carriage assembly 16 is engaged with the liner hub assembly 14 through the connection of the lead screw shaft 161 between them. While the liner tube A is being formed and is progressively winding through the sewer pipe, the wheeled carriage assembly 16 is in front of the front end of the liner tube A. The wheels 166a, 167a of the stabilizer structures 166, 167 are engaged with the top and bottom inner walls, respectively, of the sewer pipe, whereby the wheeled carriage assembly 16 can move forward along the sewer pipe. In one embodiment of the operation of the invention, the wheeled carriage assembly 16 is carried by the forward movement of the liner tube A as a result of the stop washer 161d of the lead screw shaft 161 resting against the front end of the shaft/clutch housing 141. At the same time, the liner tube A is winding through the sewer pipe and the liner hub assembly 14, as a consequence, is rotating relative to the wheeled carriage assembly 16. One particular feature of the wheeled carriage assembly 16 is that it serves to keep the liner tube A centered in the pipe and away from the pipe walls where obstructions occur.

If the liner tube A comes in contact with an obstruction that prevents it from continuing, the towing system 168 is activated pulling forward on the wheeled carriage assembly 16. The forward motion of the wheeled carriage assembly 16 engages the first and second spiral jaw clutch faces 141b, 162 with each other. As the towing system 168 continues to pull on the wheeled carriage assembly 16, the liner tube A through the liner hub assembly 14 is also pulled forward. Further, the inter-engagement between the threaded portion 161e of the lead screw shaft 161 with the lead screw nut 169 will cause the lead screw shaft 161 to rotate relative to the wheeled carriage assembly 16. This will generate a torque from the lead screw shaft 161 through the inter-engaged first and second spiral jaw clutch faces 141b 162 and to the liner tube A. As a result, the combination of the torque form the lead screw shaft, the torque from the formation of the liner tube A, the pulling force of the towing system 168 and the pushing force from the formation of the liner tube A together will free the liner tube A from the obstruction.

As noted above, the spring-based urging motion of the pivot arm 172 causes the wheels 166a or 167a on the wheel base arm 176 to maintain in contact with the inner wall of the sewer pipe. Since limited relative translation between the outer housing 165a and the inner housing 165b through the bearings 165c does occur, as higher pulling forces are exerted to rotate the liner tube A, relative translation between the outer housing 165a and the inner housing 165b will increase, thereby compressing the spring 174 in each of the stabilizer structures. The compression of the springs in turn generates greater forces on the wheels of the stabilizer structures against the inner wall.

Once the liner tube A is freed and able to continue winding through the sewer pipe, the towing system 168 will be deactivated, thereby disengaging the first and second spiral jaw clutch faces 141b, 162 from each other. The wheeled carriage assembly 16 will then fall back and again ride with the movement of the liner tube A by virtue of the stop washer 161d of the lead screw shaft 161 resting against the shaft/clutch housing 141.

Figure 16A:
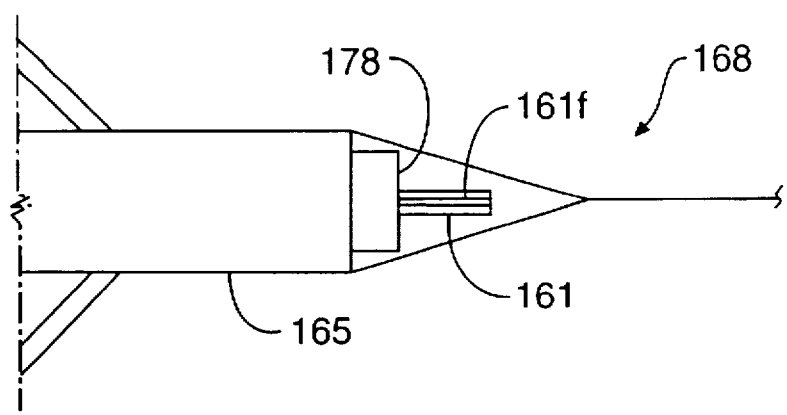
FIGS. 16A–16C show partial and cutaway views for two embodiments of the lead screw shaft returning device according to the present invention.

In a further embodiment of the wheeled carriage assembly 16, as illustrated in FIG. 16A, the main body 165 incorporates a lead screw shaft return device 178 at a front end thereof and operatively connected between the main body 165 and the lead screw shaft 161. The return device 178 is formed as a mechanism for automatically returning the lead screw shaft 161 to an initial position after the towing system 168 is disengaged. In the process of using the towing system 168 in order to free a liner tube from obstructions in the pipe, the rotational movement of the lead screw shaft 161 relative to the lead screw nut 169 may result in the lead screw shaft 161 rotatively working its way such that the frontmost limit of the threaded portion 161e runs up against the lead screw nut 169. In other words, the lead screw shaft 161 may, the process of pulling the liner tube free from an obstruction, reach its leftmost limit of translational movement relative to the lead screw nut 169, and thereby prevent any further rotational movement in the lead screw shaft 161. This would in turn prevent the system from freeing the liner tube from any further obstructions in the pipe during its construction.

Figure 16B:
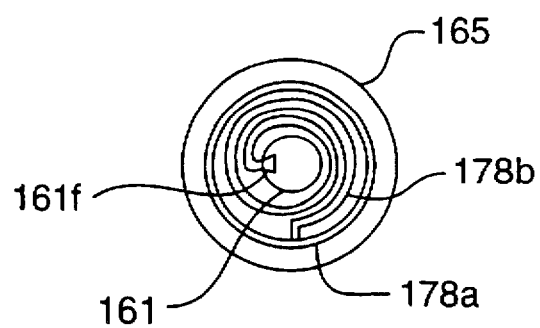

In order to prevent this situation from occurring, the return device 178 automatically forces the lead screw shaft 161 to translate back from that leftmost limit movement when the towing system 168 disengages. In one version as shown in FIG. 16B, the return device 178 incorporates a housing 178a attached to the front end of the main body 165. A clock spring 178b is fixedly connected at a base end to the housing 178a, and at a keyed end to the lead screw shaft 161. The lead screw shaft has defined along its longitudinal axis a spring sliding key slot 161f. The keyed end of the clock spring 178b is slidably engaged in the key slot 161f.

While the towing system 168 is engaged and the lead screw shaft 161 is rotating along the lead screw nut 169 to free the liner tube A, the rotational movement of the lead screw nut 161 is windingly compressing the clock spring 178b, and building up spring tension therein. As the lead screw shaft 161 translates towards its leftmost limit, the keyed end of the clock spring 178b slides along the keyed slot 161f, thereby allowing the clock spring 178b maintain its integrity, and continue compressing and building up spring tension. When the towing system 168 disengages and the wheeled carriage assembly 16 begins to fall back and ride with the movement of the liner tube A, the built-up spring tension in the clock spring 178b will release whereby the clock spring 178b will force the lead screw shaft 161 to rotate in the direction opposite of the spring tension and thereby translate forward relative to the lead screw nut 169. As a result, the lead screw shaft 161 is restored to a starting position for re-engagement of the towing system 168.

Figure 16C:
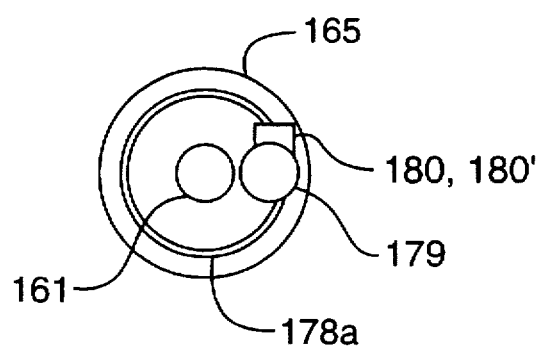

In another version of the return device 178, instead of a clock spring, a motor 179, as shown in FIG. 16C, may be used to rotate the lead screw shaft 161 in a direction opposite to that when the towing system 168 is engaged. For example, if an electric motor is used, the motor 179 is operatively connected to the lead screw shaft via a gearing system, a belt system or other conventional drive-connecting device as would be known in the art. The motor 179 is energized when the towing system 168 disengages and the wheeled carriage system 16 begins to ride with the movement of the liner tube A. The signals energizing the motor 179 may be generated by an onboard controller circuit 180 that detects the conditions of, for example, (1) having engaged the towing system 168 to free the liner tube A from obstructions, (2) the lead screw shaft 161 having reached its leftmost translational limit, and (3) the towing system 168 disengaging after freeing the liner tube A. Power for the motor 179 may be provided through an onboard battery supply (not shown) or through power supply wires (not shown) originating from outside the pipe. The structure and operation of the controller circuit 180 and either power supply system would be consistent with those of similar devices as known in the art.

Alternatively, the signals energizing the motor 179 may be generated remotely from a remote user control panel. The signals from the user control panel would be received by an interface circuit 180+ on the motor 179. The interface circuit 180' would then energize the motor accordingly. In operation, a user would observe when the towing system 168 engages to free the liner tube A and when the towing system disengages. The user could, at any time after the towing system disengages, activate the motor 179 through the control panel and the interface circuit 180'. Alternatively, if the user were to observe that the lead screw shaft 161, even after the towing system 168 is used, has not yet reached its leftmost translational limit, the user could delay activating the motor until after the towing system 168 has been used again. Under either condition, the user would determine when to re-initialize the lead screw shaft 161.

Although the present invention has been fully described in connection with the preferred embodiment thereof with reference to the accompanying drawings, it is to be noted that various changes and modifications will be apparent to those skilled in the art. For example, other materials may be substituted for stainless steel so long as such selected materials preserve the characteristics of (1) withstanding the corrosive effects of the elements and environment in the underground pipes; (2) being of sufficient weight to resist being damaged or displaced by the force of movement of the flowing materials; and (3) being sufficiently rugged and resilient so as to resist being damaged by the various forces of impact, friction, mechanical stress or strain and torque during operation. Such changes and modifications are to be understood as included within the scope of the present invention as defined by the appended claims, unless they depart therefrom.

What is claimed is:

1. A system for forming a liner in an underground pipe while material is flowing through the pipe, comprising:

means for assembling a liner tube to line said underground pipe, said assembling means including means for feeding liner material into said underground pipe, means for forming said liner material from said feeding means into said liner tube, and means for mounting said feeding means and said forming means in said underground pipe; and means for preventing said liner tube from being obstructed in said underground pipe as said liner tube is being assembled.

2. A system according to claim 1, wherein said obstruction preventing means includes means for generating a torque on said liner tube so as to release said liner tube from obstructions in said underground pipe.

3. A system according to claim 1, wherein said assembling means further includes means for generating at least one of a driving force and a torque to push said liner tube through said underground pipe as said liner tube is being assembled.

4. A system for generating a liner tube to be fed through an underground pipe while material is flowing through said pipe, comprising:

a liner winding assembly including a feeding and driving device for feeding liner material into said underground pipe, means for forming said liner material into a liner tube, and a mounting device for fixedly mounting said feeding and driving device and said forming means in said underground pipe, said feeding and driving device including means for generating a driving force to rotatively move said liner tube into and through said underground pipe as said liner tube is being formed;

a carriage assembly operatively connected to a front end of said liner tube being formed, said carriage assembly including means for movably supporting said carriage assembly as said liner tube moves into and through said underground pipe;

a towing device for generating a pulling force on said carriage assembly so as to release said liner tube from obstructions, said carriage assembly further including means for generating a torque on said liner tube based on said towing device pulling said carriage assembly; and a liner hub assembly including means fixedly connected to said front end of said liner tube being formed, for operatively connecting said carriage assembly with said liner tube whereby said pulling force generated by said towing device is translated into said torque generated through said carriage assembly which is then operatively exerted on said liner tube so as to release said liner tube from obstructions.

5. A system as set forth in claim 4, wherein said driving force generating means of said feeding and driving device includes a drive motor with a friction element rotatively connected thereto whereby said liner material is movably fed through frictional contact with said friction element as said friction element rotates via said drive motor.

6. A system as set forth in claim 4, wherein said means for forming said liner material into a liner tube includes a guide element with an inner cylindrical surface into which said liner material is fed whereby force exerted on said liner material by said driving force generating means in combination with contact with said inner cylindrical surface of said guide element windingly forms said liner material into a tubular shape having a plurality of helical strip portions.

7. A system as set forth in claim 6, wherein said liner winding assembly further includes means for lockingly connecting adjacent helical strip portions of said tubular shape so as to form said liner tube.

8. A system as set forth in claim 4, wherein said mounting device for fixedly mounting said feeding and driving device and said forming means in said underground pipe includes a circular mounting frame fixedly mountable to a manhole wall of said underground pipe.

9. A system as set forth in claim 4, wherein said mounting device for fixedly mounting said feeding and driving device and said forming means in said underground pipe includes a mounting frame having an outer structural shape matching a shape of an inner wall surface of said underground pipe and fixedly mountable to a manhole wall of said underground pipe.

10. A system as set forth in claim 4, wherein said means for movably supporting said carriage assembly includes first and second stabilizer structures, each of said first and second stabilizer structures including means for maintaining urging contact with top and bottom wall surfaces of said underground pipe, respectively, and means for movably supporting said first or second stabilizer structure while in urging contact with said respective top or bottom wall surface.

11. A system as set forth in claim 4, wherein said connecting means of said liner hub assembly includes a connection housing through which said carriage assembly operatively connects with said liner hub assembly and a support structure for fixedly supporting said connection housing within said liner tube.

12. A system as set forth in claim 11, further comprising a connection shaft operatively connecting said carriage assembly with said liner hub assembly, wherein said connection shaft includes first and second ends, said first end being rotatively supported in said carriage assembly and said second end being movably supported in said connection housing, and a torque transmitting element fixedly connected to said second end, and said connection housing includes a torque receiving element fixedly positioned to receive said torque transmitting element when said towing device pulls said carriage assembly whereby said torque generated through said carriage assembly is transferred through said connecting shaft to said torque transmitting and receiving elements so as to operatively exert said torque on said liner tube.

13. A method for generating a liner tube in an underground pipe while material is flowing through said pipe, comprising the steps of:

feeding liner material into said underground pipe;

windingly forming said liner material into said liner tube while said liner material is being fed into said underground pipe;

generating a driving force to rotatively move said liner tube into and through said underground pipe as said liner tube is being formed; and generating a torque on said liner tube being formed when obstructions are encountered in said underground tube so as to release said liner tube therefrom.

14. A method as set forth in claim 13, wherein said step of windingly forming said liner material into a liner tube includes guiding said liner material in combination with generating said driving force whereby said liner material windingly forms into a tubular shape having a plurality of helical strip portions.

15. A method as set forth in claim 14, wherein said step of windingly forming said liner material into a liner tube further includes the step of lockingly connecting adjacent helical strip portions of said tubular shape so as to form said liner tube.

\* \* \* \* \*